(12) United States Patent
Kang et al.

(10) Patent No.: US 8,289,320 B2
(45) Date of Patent: Oct. 16, 2012

(54) 3D GRAPHIC RENDERING APPARATUS AND METHOD

(75) Inventors: Byung-Kwon Kang, Suwon-si (KR); Sung-Hee Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 947 days.

(21) Appl. No.: 12/253,513

(22) Filed: Oct. 17, 2008

(65) Prior Publication Data

US 2009/0102837 A1 Apr. 23, 2009

Related U.S. Application Data

(60) Provisional application No. 60/981,543, filed on Oct. 22, 2007.

(30) Foreign Application Priority Data

Feb. 12, 2008 (KR) .................. 10-2008-0012669

(51) Int. Cl.
*G06T 15/00* (2011.01)

(52) U.S. Cl. ........ 345/422; 345/419; 345/421; 345/592; 345/594; 345/622; 345/629; 345/662

(58) Field of Classification Search .................. 345/419, 345/421, 422, 592, 594, 622, 629, 662
See application file for complete search history.

(56) References Cited

U.S. PATENT DOCUMENTS

| | | | |
|---|---|---|---|
| 5,463,722 A * | 10/1995 | Venolia ................. | 345/662 |
| 7,271,814 B2 * | 9/2007 | Anwar et al. .......... | 345/629 |
| 7,425,955 B2 * | 9/2008 | Long et al. ............ | 345/421 |
| 7,595,797 B2 * | 9/2009 | Kondo ................... | 345/418 |
| 2001/0013867 A1 * | 8/2001 | Watanabe et al. ..... | 345/427 |
| 2004/0005099 A1 | 1/2004 | Gu | |
| 2005/0057573 A1 * | 3/2005 | Andrews ............... | 345/592 |
| 2006/0001681 A1 * | 1/2006 | Smith ..................... | 345/629 |
| 2008/0021680 A1 * | 1/2008 | Elsberg et al. ......... | 703/2 |
| 2008/0024486 A1 * | 1/2008 | Middler et al. ........ | 345/419 |
| 2008/0094395 A1 * | 4/2008 | Woo et al. .............. | 345/422 |
| 2009/0027380 A1 * | 1/2009 | Rajan et al. ............ | 345/419 |

FOREIGN PATENT DOCUMENTS

| | | |
|---|---|---|
| JP | 2005-235015 A | 9/2005 |
| KR | 10-2004-0033993 A | 4/2004 |
| KR | 10-2006-0089926 A | 8/2006 |

* cited by examiner

*Primary Examiner* — Xiao M. Wu
*Assistant Examiner* — Todd Buttram
(74) *Attorney, Agent, or Firm* — Sughrue Mion, PLLC

(57) ABSTRACT

A three-dimensional (3D) graphic rendering apparatus is provided. The 3D graphic rendering apparatus includes an object-information extraction module which extracts a bound box of each of a plurality of objects, including an i-th object and a j-th object, wherein i and j are natural numbers; an object alignment module which aligns the i-th object and the j-th object according to distances of the i-th and j-th objects, based on the extracted bound boxes of the i-th and j-th objects, from a visual point; and a rendering module which sequentially renders the aligned i-th and j-th objects such that an object among the i-th and j-th objects distant from the visual point can be rendered earlier than an object among the i-th and j-th objects less distant from the visual point.

19 Claims, 11 Drawing Sheets

| PLANES VISIBLE FROM VISUAL POINT | VERTICIES |
|---|---|
| P0 | V0, V1, V2, V3 |
| ... | ... |
| P5 | V4, V5, V6, V7 |
| P0, P1 | V0, V1, V2, V3, V4, V5 |
| ... | ... |
| P4, P5 | V0, V1, V5, V6, V7, V4 |
| P0, P1, P2 | V0, V1, V5, V6, V7, V3 |
| ... | ... |
| P3, P4, P5 | V0, V1, V5, V6, V7, V3 |

SIX ENTRIES FOR THE CASE WHEN ONLY ONE PLANE IS VISIBLE FROM VISUAL POINT

TWELVE ENTRIES FOR THE CASE WHEN TWO PLANES ARE VISIBLE FROM VISUAL POINT

EIGHT ENTRIES FOR THE CASE WHEN THREE PLANES ARE VISIBLE FROM VISUAL POINT (a)

```
MakeRenderingOrder(i)
{
        InsertRenderingQueue(i);                              ...... (1)
        for(each objects j in the front_list of object i)     ...... (2)
        {
                Remove object i from back_list of object j;   ...... (3)
                if(isBackListEmpty(j)) MakeRenderingOrder(j); ...... (4)
        }
}
```

3D GRAPHIC RENDERING APPARATUS AND METHOD

CROSS-REFERENCE TO RELATED APPLICATION

This application claims priority from U.S. Provisional Application No. 60/981,543 filed on Oct. 22, 2007 in the United States Patent and Trademark Office and Korean Patent Application No. 10-2008-0012669 filed on Feb. 12, 2008 in the Korean Intellectual Property Office, the disclosures of which are incorporated herein by reference in their entirety.

BACKGROUND OF THE INVENTION

1. Field of the Invention

Apparatuses and methods consistent with the present invention relate to three-dimensional (3D) graphic rendering, and more particularly, to 3D graphic rendering which can effectively perform alpha blending on a plurality of translucent objects of a 3D graphical user interface (GUI) by sequentially aligning the translucent objects.

2. Description of the Related Art

Three colors, red (R), green (G) and blue (B), are generally used to render images. An alpha channel may be additionally used to render images. An alpha channel indicates the transparency of each pixel of an image and is represented by a value between 0 and 255. If an alpha channel has a value of 0, each pixel of the subject image is fully transparent. On the other hand, if an alpha channel has a value of 255, each pixel of the subject image is fully opaque. An alpha channel is used to add transparency in images when blending transparent objects in the image such as a glass window or a glass cup. Such blending of transparent images is referred to as alpha blending.

Recently, alpha blending has been implemented in various embedded systems for rendering translucent objects, which have a small depth with respect to one of the coordinate system axes and are adjacent to one another, such as a menu of a GUI. That is, alpha blending is a technique of rendering translucent objects by blending the colors of overlapping translucent objects. The color of a translucent object may be determined by blending the color of the translucent object and the color of an object that underlies the translucent object in a certain ratio corresponding to the transparency of the translucent object.

The results of performing alpha blending on a number of objects within an image may vary according to the order in which the objects are rendered. Thus, in order to provide a precise alpha blending result, translucent 3D objects must be properly rendered in order of the distances of the translucent 3D objects from a predetermined visual point. That is, if alpha blending is performed on translucent 3D objects that are rendered in an improper order, the result of alpha blending may not be precise or visually acceptable. Therefore, it is important to render objects in a proper order for accurate and precise alpha blending.

In order to achieve this goal, various alignment techniques for sequentially aligning objects have been developed. For example, the painter's algorithm is an algorithm for deciding which object among a plurality of overlapping objects is to be painted in front of the others. The painter's algorithm generally provides mathematically precise rendering results. However, since the painter's algorithm involves the alignment of two-dimensional (2D) polygons, the performance of the painter's algorithm is highly dependent upon the number of polygons used. In addition, in the case of rendering 3D objects, it generally takes a considerable amount of complicated computation to determine the relative positions of a plurality of objects with respect to a predetermined visual point. Thus, the painter's algorithm may not be suitable for use in real-time rendering.

Alternatively, alignment techniques involving the use of a space partitioning data structure such as a binary space partitioning (BSP) tree or a k-dimensional (kD) tree may be used. In these alignment techniques, the relative positions of a plurality of objects with respect to a visual point are determined using 3D planes, and a tree is configured based on the result of the determination. Once the tree is obtained, the objects can be quickly aligned as a visual point changes during a run time based on the configured tree. However, whenever a position of an object changes, a new tree needs to be configured. Thus, the above-mentioned alignment techniques may not be suitable for use in applications such as 3D GUIs, which include animation objects.

Therefore, it is desirable to develop a rendering apparatus which can considerably reduce the amount of computation required for the alignment of objects, realize precise alpha blending in real time, and be suitable for use in an embedded system having limited hardware performance.

SUMMARY OF THE INVENTION

The present invention provides a 3D graphic rendering apparatus which can effectively perform alpha blending on a plurality of translucent objects of a 3D GUI by sequentially aligning the translucent objects, and a 3 d graphic rendering method thereof. The 3D graphic rendering apparatus and method can be effectively applied to an embedded system having limited hardware performance.

The aspects of the present invention, however, are not restricted to those set forth herein. The above and other aspects of the present invention will become more apparent to one of daily skill in the art to which the present invention pertains by referencing a detailed description of the present invention given below.

According to an aspect of the present invention, there is provided a 3D graphic rendering apparatus including: an object-information extraction module which extracts a bound box of each of a plurality of objects, including an i-th object and a j-th object, wherein i and j are natural numbers, an object alignment module which aligns the i-th object and the j-th object according to distances of the i-th and j-th objects, based on the extracted bound boxes of the i-th and j-th objects, from a visual point, and a rendering module which sequentially renders the aligned i-th and j-th objects such that an object among the i-th and j-th objects distant from the visual point can be rendered earlier than an object among the i-th and j-th objects less distant from the visual point.

The object-information extraction module may comprises an object coordinate extractor which extracts object coordinates of each of the bound boxes in an object coordinate system, and an object coordinate converter which converts the extracted object coordinates of each of the bound boxes to an eye coordinate system.

The object alignment module may comprise an overlapping object determiner which determines whether the i-th and j-th objects overlap each other when viewed from the visual point, a reference plane extractor which extracts at least one reference plane from the i-th and j-th objects if the i-th and j-th objects are determined to overlap each other when viewed from the visual point, and an object position determiner which determines which of the i-th and j-th objects is in front of the other object among the i-th and j-th objects by using the at least one extracted reference plane.

The overlapping object determiner may extract one or more planes that are visible from the visual point from each of the bound boxes of the i-th and j-th objects, extracts a number of vertices that form the outline of the extracted one or more planes of the i-th object and a number of vertices that form the outline of the extracted one or more planes of the j-th object, and determines whether a first polygon formed by the extracted vertices of the i-th object and a second polygon formed by the extracted vertices of the j-th object overlap each other.

If a plurality of vertices of the bound box of one of the i-th and j-th objects are all in front of a first plane of the bound box of the other object among the i-th and j-th objects, the reference plane extractor may extract the first plane as the reference plane.

The object position determiner may determine which of the i-th and j-th objects is in front of the other based on a number of reference planes extracted by the reference plane extractor.

If two or more reference planes are extracted by the reference plane extractor, the object position determiner may determine which of the i-th and j-th objects is in front of the other object among the i-th and j-th objects by comparing a first distance between one of a plurality of vertices of the bound box of the i-th object closest to the visual point and the visual point with a second distance between one of a plurality of vertices of the bound box of the j-th object closest to the visual point and the visual point.

If only one reference plane is extracted by the reference plane extractor, the object position determiner may determine which of the i-th and j-th objects is in front of the other object among the i-th and j-th objects by comparing the visual point and a position of the only one extracted reference plane.

The rendering module may divide the objects into one or more groups, each group comprising one or more objects that overlap each other when viewed from the visual point, and perform rendering in units of the one or more groups.

According to another aspect of the present invention, there is provided a 3D graphic rendering method including extracting a bound box of each of a plurality of objects, including an i-th object and a j-th object, wherein i and j are natural numbers, aligning the i-th object and the j-th object according to distances, based on the extracted bound boxes of the i-th and j-th objects, of the i-th and j-th objects from a visual point, and sequentially rendering the aligned i-th and j-th objects such that an object among the i-th and j-th objects distant from the visual point can be rendered earlier than an object among the i-th and j-th objects less distant from the visual point.

The extracting may comprise extracting object coordinates of each of the bound boxes in an object coordinate system, and converting the extracted object coordinates of each of the bound boxes to an eye coordinate system.

The aligning may comprise (i) determining which one of the i-th and j-th objects is in front of the other object among the i-th and j-th objects and aligning the i-th and j-th objects according to the result of the determining, and (ii) performing (i) on objects other than the i-th and j-th objects among the plurality of the objects.

The determining in (i) may comprise (iii) determining whether the i-th and j-th objects overlap each other when viewed from the visual point, (iv) if the i-th and j-th objects are determined to overlap each other when viewed from the visual point, extracting at least one reference plane from the i-th and j-th objects, and (v) determining which of the i-th and j-th objects is in front of the other object among the i-th and j-th objects by using the at least one reference plane, and (vi) aligning the i-th and j-th objects according to the result of the determining performed in (v).

The determining in (iii) may comprise extracting one or more planes that are visible from the visual point from each of the bound boxes of the i-th and j-th objects, extracting a first number of vertices that form the outline of the one or more extracted planes of the i-th object and a second number of vertices that form the outline of the one or more extracted planes of the j-th object, and determining whether a first polygon formed by the first number of extracted vertices of the i-th object and a second polygon formed by the second number of extracted vertices of the j-th object overlap each other.

If a plurality of vertices of the bound box of one of the i-th and j-th objects are all in front of a first plane of the bound box of the other object among the i-th and j-th objects, the extracting in (iv) may comprise extracting the first plane as the reference plane.

The determining in (v) may comprise determining which of the i-th and j-th objects is in front of the other object among the i-th and j-th objects based on a number of reference planes extracted by the reference plane extractor.

If two or more reference planes are extracted from the i-th and j-th objects, the determining in (v) may further comprise determining which of the i-th and j-th objects is in front of the other object among the i-th and j-th objects by comparing a first distance between one of a plurality of vertices of the bound box of the i-th object closest to the visual point and the visual point with a second distance between one of a plurality of vertices of the bound box of the j-th object closest to the visual point and the visual point.

If only one reference plane is extracted from the i-th and j-th objects, they determining in (v) may further comprise determining which of the i-th and j-th objects is in front of the other object among the i-th and j-th objects by comparing the visual point and a position of the only one extracted reference plane.

The rendering may comprise dividing the objects into one or more groups, each group comprising one or more objects that overlap each other when viewed from the visual point, and performing rendering in units of the one or more groups.

According to another aspect of the present invention, there is provided a computer-readable storage medium storing thereon a program implementing functions of a 3D graphic rendering method, the functions including extracting a bound box of each of a plurality of objects including an i-th object and a j-th object, wherein i and j are natural numbers, aligning the i-th object and the j-th object according to distances, based on the extracted bound boxes of the i-th and j-th objects, of the i-th and j-th objects from a visual point, and sequentially rendering the aligned i-th and j-th objects such that an object among the i-th and j-th objects distant from the visual point can be rendered earlier than an object among the i-th and j-th objects less distant from the visual point.

BRIEF DESCRIPTION OF THE DRAWINGS

The above and/or other aspects of the present invention will become apparent and more readily appreciated from the following description of the exemplary embodiments taken in conjunction with the attached drawings, in which:

FIG. 6 illustrates an exemplary diagram of a lookup table showing the correspondence between a number of planes that are visible from a visual point and a number of vertices that form the outline of the planes;

FIG. 10 illustrates a diagram of an exemplary algorithm for performing rendering in units of groups, each group including one or more objects that overlap each other when viewed from a visual point.

DETAILED DESCRIPTION OF THE EXEMPLARY EMBODIMENTS

Figure 1:
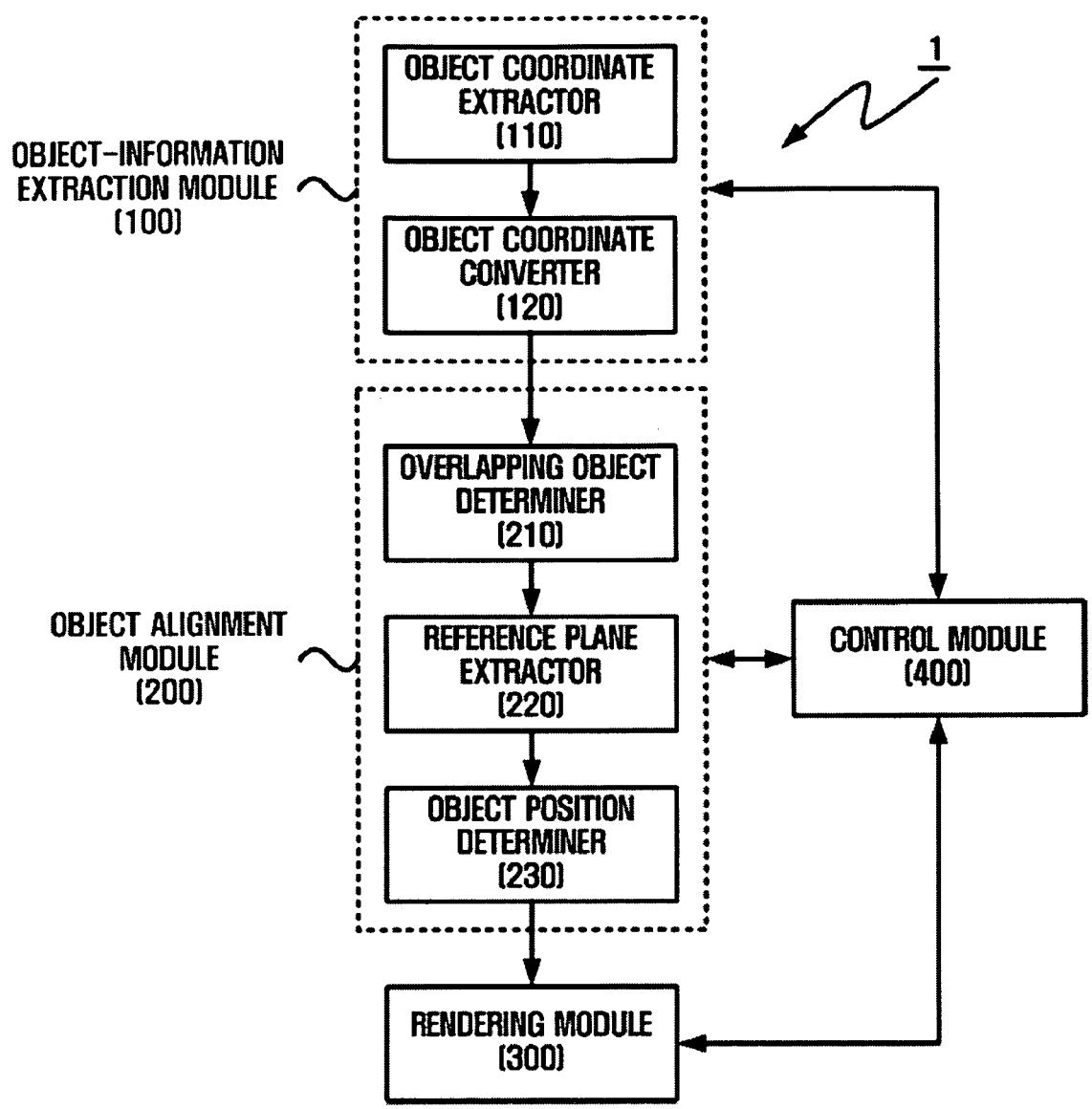
FIG. 1 illustrates a block diagram of a 3D graphic rendering apparatus according to an exemplary embodiment of the present invention.

The present invention will now be described more fully with reference to the accompanying drawings, in which exemplary embodiments of the invention are shown. The invention may, however, be embodied in many different forms and should not be construed as being limited to the exemplary embodiments set forth herein. Rather, these exemplary embodiments are provided so that this disclosure will be thorough and complete, and will fully convey the concept of the invention to those skilled in the art. Like reference numerals in the drawings denote like elements, and thus their description will be omitted.

A 3D graphic rendering apparatus and method according to the present invention will hereinafter be described in detail with reference to the accompanying drawings.

FIG. 1 illustrates a block diagram of a 3D graphic rendering apparatus 1 according to an exemplary embodiment of the present invention. Referring to FIG. 1, the 3D graphic rendering apparatus 1 includes an object-information extraction module 100, an object alignment module 200, and a rendering module 300.

The object-information extraction module 100 extracts a bound box of each object. The bound box represents a 3D area in the image in which the object is enclosed. The object-information extraction module 100 may include an object coordinate extractor 110 which obtains coordinates of a bound box of each object in an object coordinate system and an object coordinate converter 120 which converts the object coordinates provided by the object coordinate extractor 110 to an eye coordinate system.

The object alignment module 200 aligns a plurality of objects according to bound box information provided by the object-information extraction module 100. The object alignment module 200 may include an overlapping object determiner 210 which determines whether two objects overlap each other when viewed from a predetermined visual point; a reference plane extractor 220 which extracts a reference plane from each of the two overlapping objects; and an object position determiner 230 which determines which of the two objects is in front of the other based on the reference planes provided by the reference plane extractor 220 and aligns the two objects according to the result of the determination.

The rendering module 300 sequentially renders a plurality of objects aligned by the object alignment module 200 according to the distances of the objects from the predetermined visual point.

The 3D graphic rendering apparatus 1 may also include a control module 400 which controls the operations of the object-information extraction module 100, the object alignment module 200, and the rendering module 300.

The 3D graphic rendering apparatus 1 may also include a storage module (not shown) and a display module (not shown).

The storage module may store various information such as bound box information, converted coordinate information, and alignment information of each object. The storage module is a module such as a hard disk, a flash memory, a compact flash (CF) card, a secure digital (SD) card, a smart media (SM) card, a multimedia card (MMC), or a memory stick to/from which information can be input/output. The storage module may be included in the 3D graphic rendering apparatus 1 or in an external apparatus.

The display module displays a rendered object on a screen. Various display devices such as a cathode ray tube (CRT), a liquid crystal display (LCD), a light-emitting diode (LED), an organic LED (OLED), or a plasma display panel (PDP) may be used as the display module.

The operation of the 3D graphic rendering apparatus 1, i.e., a 3D graphic rendering method according to an exemplary embodiment of the present invention, will hereinafter be described in detail with reference to FIG. 2.

Figure 2:
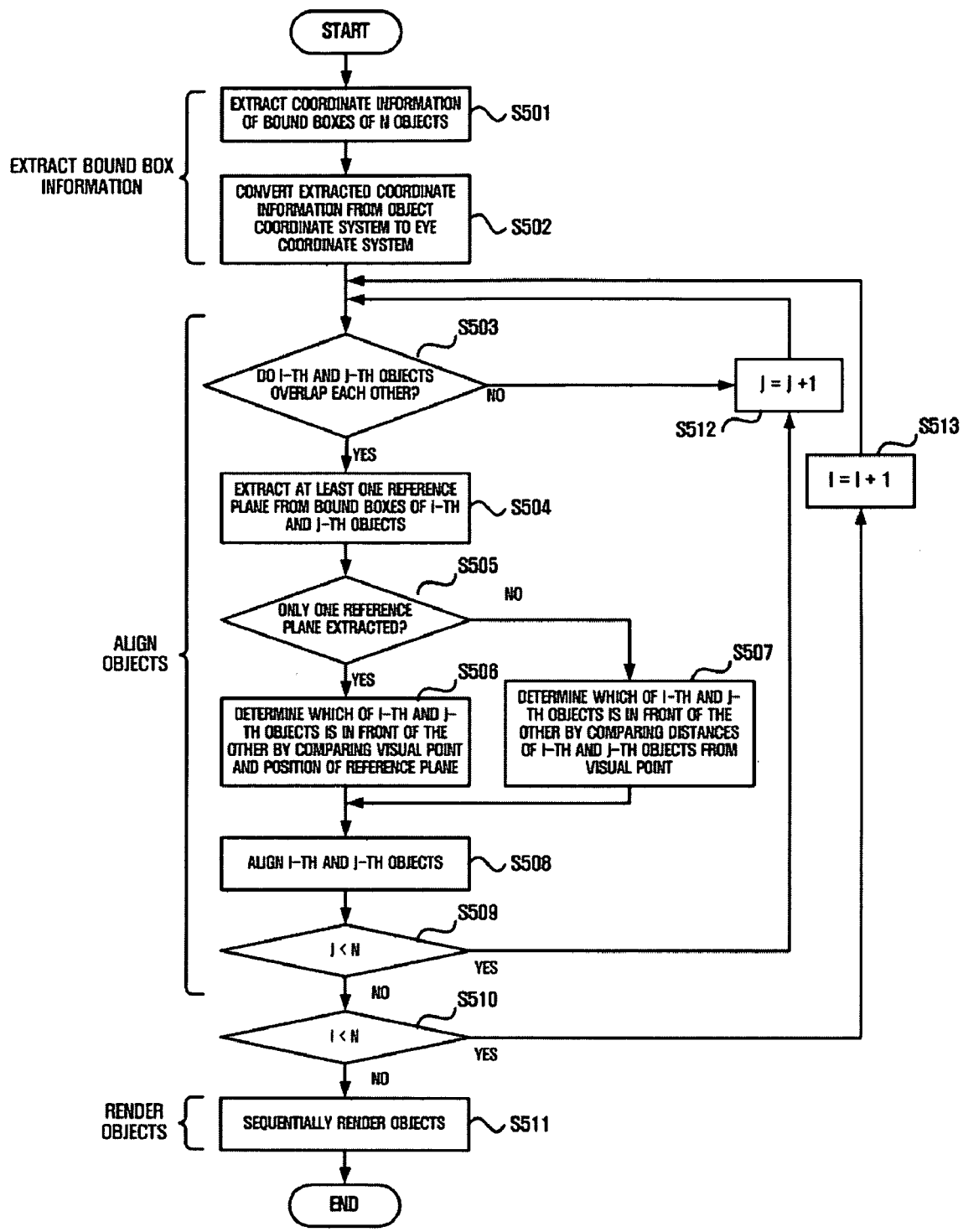
FIG. 2 illustrates a flowchart of a 3D graphic rendering method according to an exemplary embodiment of the present invention.

FIG. 2 illustrates a flowchart of a 3D graphic rendering method according to this exemplary embodiment of the present invention. Referring to FIG. 2, the object-information extraction module 100 extracts bound box information of each of a plurality of objects N of a 3D graphic user interface (GUI). For this, the object coordinate extractor 110 extracts coordinate information of the bound box of each of the N objects (S501), and the object coordinate converter 120 converts the extracted coordinate information into eye coordinate information (S502).

Figure 3:
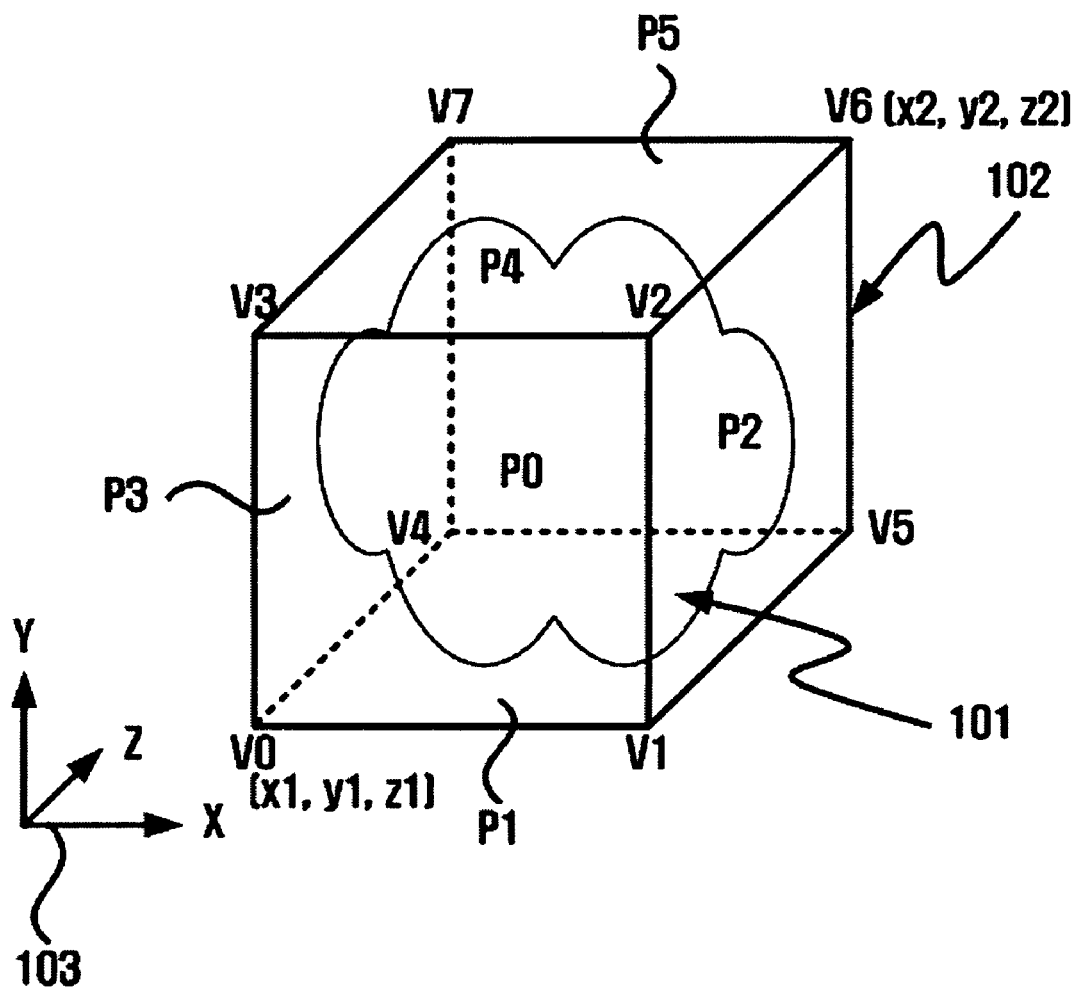
FIG. 3 illustrates an exemplary diagram for explaining the extraction of coordinate information of a bound box of an object, as performed by an object coordinate extractor illustrated in FIG. 1.
Figure 4:
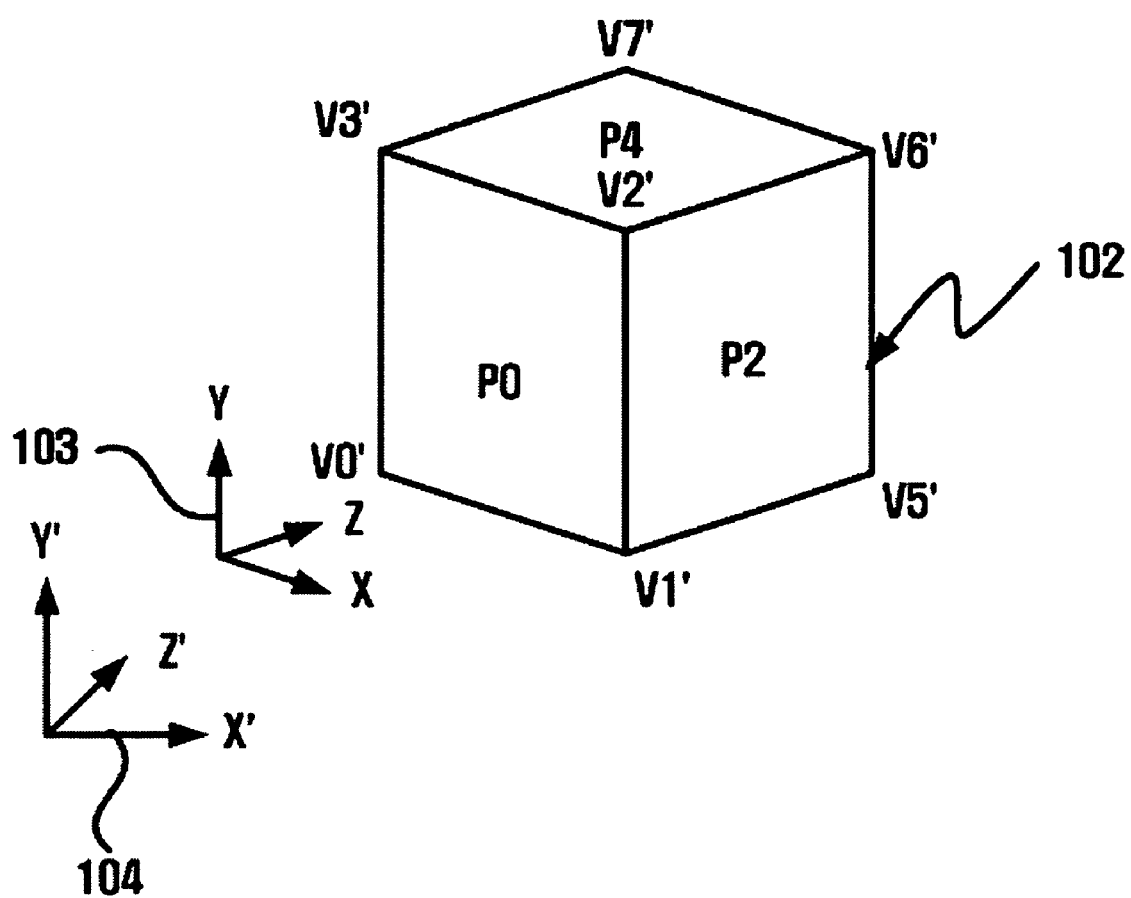
FIG. 4 illustrates an exemplary diagram for explaining the conversion of coordinate information, as performed by an object coordinate converter illustrated in FIG. 1.

FIG. 3 illustrates a diagram for explaining the extraction of coordinate information of a bound box of an object, as performed by the object coordinate extractor 110, and FIG. 4 illustrates a diagram for explaining the conversion of the extracted coordinate information, as performed by the object coordinate converter 120.

Referring to FIG. 3, a bound box 102 of an object 101 has the shape of a hexahedron that surrounds the object 101. The bound box 102 has six planes P0 through P5 and eight vertices V0 through V7.

More specifically, the bound box 102 of the object 101 may be configured as an axis-aligned bound box having three planes that perpendicularly intersect three axes (i.e., the X, Y, and Z axes) of an object coordinate system 103. Therefore, since the object 101 is surrounded by two parallel planes (i.e., the planes P0 ($Z=z1$) and P5 ($Z=z2$)) that perpendicularly intersect the Z axis of the object coordinate system 103, two parallel planes (i.e., the planes P3 ($X=x1$) and P2 ($X=x2$)) that perpendicularly intersect the X axis of the object coordinate system 103, and two parallel planes (i.e., the planes P1 (Y=y1) and P4 (Y=y2)) that perpendicularly intersect the Y axis of the object coordinate system 103, object coordinate information of the bound box 102 may be fully represented by two vertices, i.e., V0 (x1, y1, z1) and V6 (x2, y2, z2).

The object coordinate information of the bound box 102 may not need to be calculated during a run time. Instead, the object coordinate information of the bound box 102 may be stored in advance along with other information related to the object 101. Therefore, the coordinate information of the bound box 102 may simply be obtained from various information related to the object 101, which is loaded on a screen when a 3D GUI is configured to display the object 101.

Once the object coordinate information of the bound box 102 is extracted by the object coordinate extractor 110, the object coordinate extractor 110 converts the object coordinate information of the bound box 102 to an eye coordinate system 104 (S502). The eye coordinate system 104 is a coordinate system established based on the position of a user or an imaging device such as a camera, i.e., a coordinate system of a GUI in which the object 101 is actually rendered. Therefore, in order to configure a GUI with the use of the object 101, the object coordinate information of the bound box 102 must be converted to the eye coordinate system 104.

More specifically, referring to FIG. 4, the object coordinate converter 120 may convert the eight vertices V0 through V7 of the bound box 102 into vertices V0' through V7', respectively, in the eye coordinate system 104. In addition, the object coordinate converter 120 may establish a plane equation regarding each of the six planes P0 through P5 of the bound box 102 based on the vertices V0' through V7'. The plane equations may be used to determine whether two objects overlap each other.

The conversion of coordinates in one coordinate system into coordinates in another coordinate system and the establishment of a plane equation based on four vertices of the plane are obvious to one of ordinary skill in the art to which the present invention pertains, and thus, detailed descriptions thereof will be skipped.

The object alignment module 200 may align a plurality of objects based on the bound box information provided by the object-information extraction module 100. That is, the object alignment module 200 may align the objects according to the distances of the objects from the visual point. The visual point is the position of a user or an imaging device such as a camera. The visual point may correspond to the origin of the eye coordinate system 104.

For example, when there are N objects (i.e., first through N-th objects $O_1$ through $O_N$) that constitute a 3D GUI, the first through N-th objects $O_1$ through $O_N$ may be aligned by comparing two of the first through N-th objects $O_1$ through $O_N$, i.e., an i-th object (where i is a natural number) and a j-th object (where j is a natural number) and determining which of the i-th object and the j-th object is in front of the other. This process may be performed on all the N objects in such a manner that the first object $O_1$ can be sequentially compared with the second through N-th objects $O_2$ through $O_N$, and then the second object $O_2$ can be sequentially compared with the third through N-th objects $O_3$ through $O_N$.

It will hereinafter be described in detail how the i-th and j-th objects $O_i$ and $O_j$ are compared and aligned.

The overlapping object determiner 210 determines whether the i-th and j-th objects $O_i$ and $O_j$ overlap each other when viewed from the visual point (S503) because the i-th and j-th objects $O_i$ and $O_j$ may need to be aligned for alpha blending only when they overlap each other. If the i-th and j-th objects $O_i$ and $O_j$ do not overlap, the results of performing alpha blending on the i-th and j-th objects $O_i$ and $O_j$ may always be the same regardless of the order in which the i-th and j-th objects $O_i$ and $O_j$ are rendered, and thus, the alignment of the i-th and j-th objects $O_i$ and $O_j$ is unnecessary.

The determination of whether the i-th and j-th objects $O_i$ and $O_j$ overlap each other when viewed from the visual point will hereinafter be described in detail with reference to FIG. 5.

First, one or more planes that can be seen from the visual point are selected from each of the bound boxes of the i-th and j-th objects $O_i$ and $O_j$. Referring to FIG. 5, since a bound box of an object is a hexahedron, a minimum of one (FIG. 5(*a*)) to a maximum of three planes (FIG. 5(*c*)) can be seen from the visual point. In order to determine which of the six planes of a bound box are visible from the visual point, the position of each of the six planes of a bound box relative to the visual point may be considered. Planes of a bound box that are in front of the visual point may be considered visible from the visual point. As described above, since six plane equations (Ax+By+Cz+D) obtained by the object coordinate converter 120 are based on the eye coordinate system 104 and the visual point corresponds to the origin of the eye coordinate system 104, Ax+By+Cz+D=0 where D is a constant. Thus, it may be easily determined which of six planes of a bound box are visible from the visual point by comparing the sign of the constant D of each of six equations respectively corresponding to the six planes of the bound box.

Once one or more planes that are visible from the visual point are determined, vertices that form the outline of the planes are searched for. The number of planes currently visible from the visual point determines the number of vertices that form the outline of the planes currently visible from the visual point. For example, referring to FIG. 5(*a*), when only one plane is visible from the visual point, four vertices that form a rectangle are obtained. Referring to FIGS. 5(*b*) and 5(*c*), when two or three planes are visible from the visual point, six vertices that form a rectangle or a hexagon are obtained.

A lookup table indicating the correspondence between the number of planes currently visible from the visual point and the number of vertices that form the outline of the planes currently visible from the visual point may be used. An example of the lookup table is illustrated in FIG. 6.

Referring to FIGS. 3 and 6, in order to create a lookup table, six planes of a bound box of each object are respectively labeled as P0 through P5, and eight vertices of a bound box of each object are respectively labeled as V0 through V7. Then, a lookup table having a plurality of entries, each entry including a number of planes that are visible from a visual point and a number of vertices that form the outline of the planes, is created.

Figure 5:
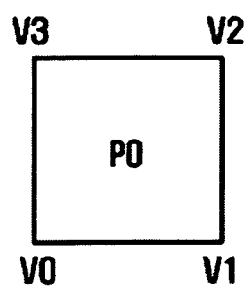
FIG. 5 illustrates a diagram for explaining the extraction of a number of planes that are visible from a visual point, as performed by an overlapping object determiner illustrated in FIG. 1.
Figure 5:
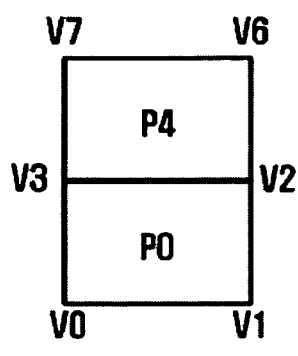
Figure 5:
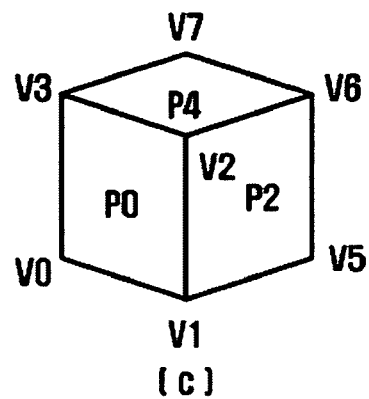

For example, referring to FIGS. 5 and 6, if the plane P0 is visible from the visual point, the vertices V0 through V3 may be determined to form the outline of the plane P0. If the planes P0 and P1 are both visible from the visual point, the vertices V0, V1, V5, V6, V2 and V3 may be determined to form the outline of the planes P0 and P1. If the planes P0, P1 and P2 are all visible from the visual point, the vertices V0, V1, V5, V6, V7 and V3 may be determined to form the outline of the planes P0, P1, and P2. Note that a pair of parallel planes of a bound box cannot be viewed from the visual point at the same time, as illustrated in FIG. 3.

In this manner, a lookup table having a total of 26 entries, each entry including one or more planes currently visible from the visual point at the same time and a number of vertices that form the outline of the planes currently visible from the visual point can be used to determine the vertices that form the outline of the visible planes. The lookup table may be created in advance when the object-information extraction module 100 extracts bound box information from an object.

Figure 7:
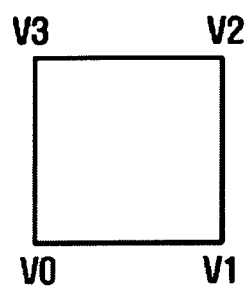
FIG. 7 illustrates an exemplary diagram for explaining the formation of a polygon based on a number of vertices that form the outline of a number of planes visible from a visual point.
Figure 7:
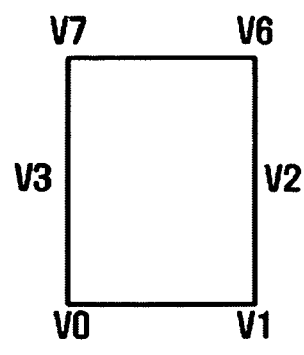
Figure 7:
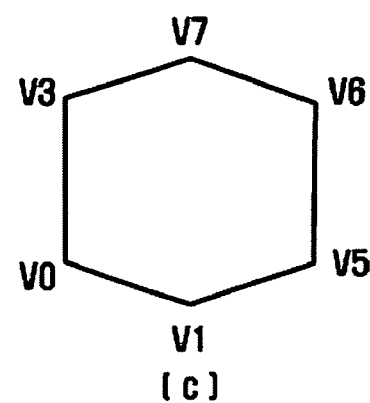

Once a number of vertices that form the outline of one or more planes currently visible from the visual point are determined, the vertices are projected onto an arbitrary plane perpendicular to the Z axis, thereby obtaining a polygon, as illustrated in FIG. 7.

It may be determined whether two polygons obtained from two objects overlap each other by using a well-known method such as a scan line method. If two polygons obtained from two objects overlap each other, it may be determined that the two objects overlap each other when viewed from the visual point.

It has been described above how the overlapping object determiner 210 determines whether the i-th and j-th objects $O_i$ and $O_j$ overlap each other. However, the present invention is not restricted to this. That is, the overlapping object determiner 210 may determine whether the i-th and j-th objects $O_i$ and $O_j$ overlap each other in various manners, other than that set forth herein.

If the overlapping object determiner 210 determines that the i-th and j-th objects $O_i$ and $O_j$ overlap each other when viewed from the visual point, the reference plane extractor 220 extracts one or more reference planes from the i-th and j-th objects $O_i$ and $O_j$ in order to determine which of the i-th and j-th objects $O_i$ and $O_j$ is closer than the other to the visual point (S504). If eight vertices of a bound box of one object are all disposed in front of a plane of a bound box of another object in the direction of the normal vector of the corresponding plane, the corresponding plane may be selected as a reference plane. Since a bound box of an object is a hexahedron, at least one reference plane can be obtained from two objects.

Figure 8:
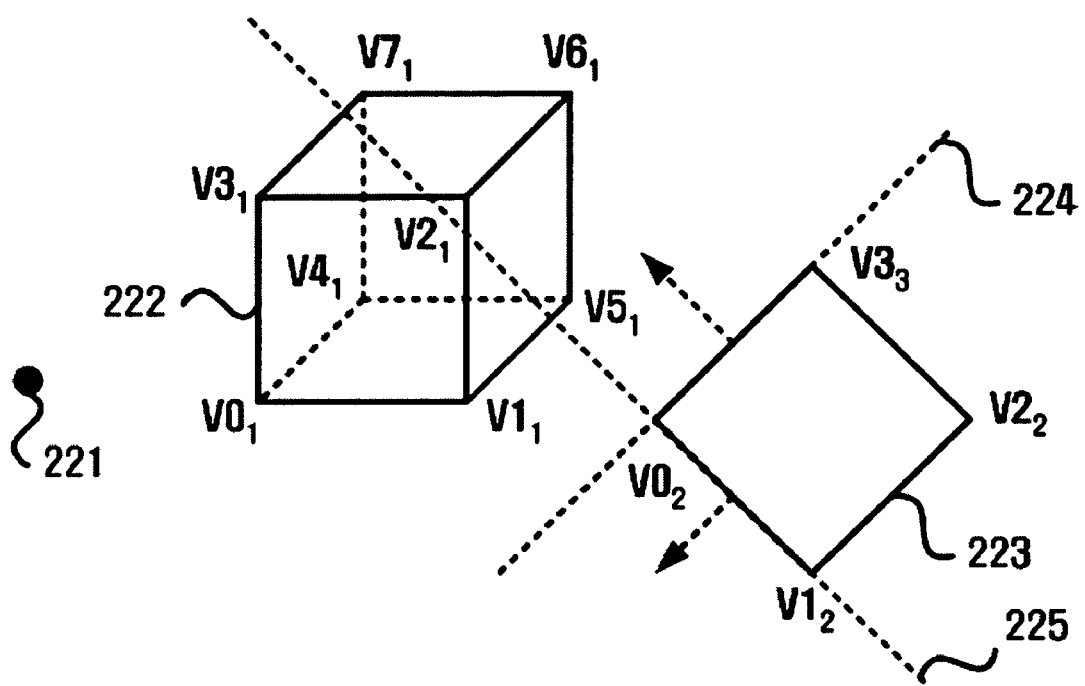
FIG. 8 illustrates an exemplary diagram for explaining the extraction of a reference plane from two objects, as performed by a reference plane extractor illustrated in FIG. 1.

FIG. 8 illustrates a diagram for explaining the extraction of a number of reference planes from two objects, as performed by the reference plane extractor 220. Referring to FIG. 8, eight vertices $V0_1$ through $V7_1$ of an object 222 are all in front of a first plane 224 of an object 223. On the other hand, only some of the eight vertices of the object 222, i.e., the vertices $V2_1$, $V5_1$, $V6_1$, and $V7_1$, are disposed in front of a second plane 225 of the object 223. In this case, the first plane 224 of the object 223 may be selected as a reference plane.

Once at least one reference plane is extracted from the i-th and j-th objects $O_i$ and $O_j$ by the reference plane extractor 220, the object position determiner 230 determines which of the i-th and j-th objects $O_i$ and $O_j$ is closer than the other to the visual point based on the reference plane and then aligns the first and second planes according to the result of the determination (S505, S506, and S507).

More specifically, if it is determined that only one reference plane is extracted from the i-th and j-th objects $O_i$ and $O_j$ (YES in S505), it is determined whether the visual point is in front of the reference plane (S506). If the visual point is at the front of the reference plane, whichever of the first and second planes has the reference plane may be determined to be more distant from the visual point (S506). On the other hand, if the visual point is at the rear of the reference plane, whichever of the first and second planes has the reference plane may be determined to be closer to the visual point (S506). Referring to FIG. 8, since a visual point 221 is in front of a reference plane, i.e., the first plane 224 of the object 223, the object 223 may be determined to be more distant than the object 222 from the visual point 221.

If more than one reference plane is extracted from the i-th and j-th objects $O_i$ and $O_j$ (NO in S505), the i-th and j-th objects $O_i$ and $O_j$ may appear overlapping each other when viewed from the visual point, and may be determined to have a skew relationship with each other. In this case, it may be determined which of the i-th and j-th objects $O_i$ and $O_j$ is in front of the other by comparing the distance between one of the vertices of the bound box of the i-th object $O_i$ closest to the visual point and the visual point and the distance between one of the vertices of the bound box of the j-th object $O_j$ closest to the visual point and the visual point (S507).

Based on the results from either operation S506 or operation S507, the objects $O_i$ and $O_j$ are aligned (S508). Once the i-th and j-th objects $O_i$ and $O_j$ are aligned, a (j+1)-th object $O_{j+1}$ may be compared with the i-th object $O_i$, and the i-th and (j+1)-th objects $O_i$ and $O_{j+1}$ are aligned according to the result of the comparison (see operations S509 and S512). If the comparison of the i-th object $O_i$ with all the other objects is complete, the above-mentioned processes may be performed on an (i+1)-th object $O_{i+1}$ (see operations S510 and S513).

As described above, any two of the N objects $O_1$ through $O_N$ are compared with each other, and the N objects $O_1$ through $O_N$ are aligned according to their distance from the visual point by using the results of the comparison and using various well-known numeric value alignment algorithms such as bubble sorting and selection sorting.

Once the alignment of the N objects $O_1$ through $O_N$ is complete, the rendering module 300 may sequentially render the N objects $O_1$ through $O_N$ according the distances of the N objects $O_1$ through $O_N$ from the visual point (S511).

More specifically, the rendering module 300 may render the N objects $O_1$ through $O_N$ such that that an object distant from the visual point can be rendered earlier than an object less distant from the visual point. Alternatively, the rendering module 300 may divide the N objects $O_1$ through $O_N$ into one or more groups, each group including one or more objects that overlap each other when viewed from the visual point, and then perform rendering in units of the groups, given that the results of rendering non-overlapping objects are always the same regardless of the order in which the non-overlapping objects are rendered.

Figure 9A:
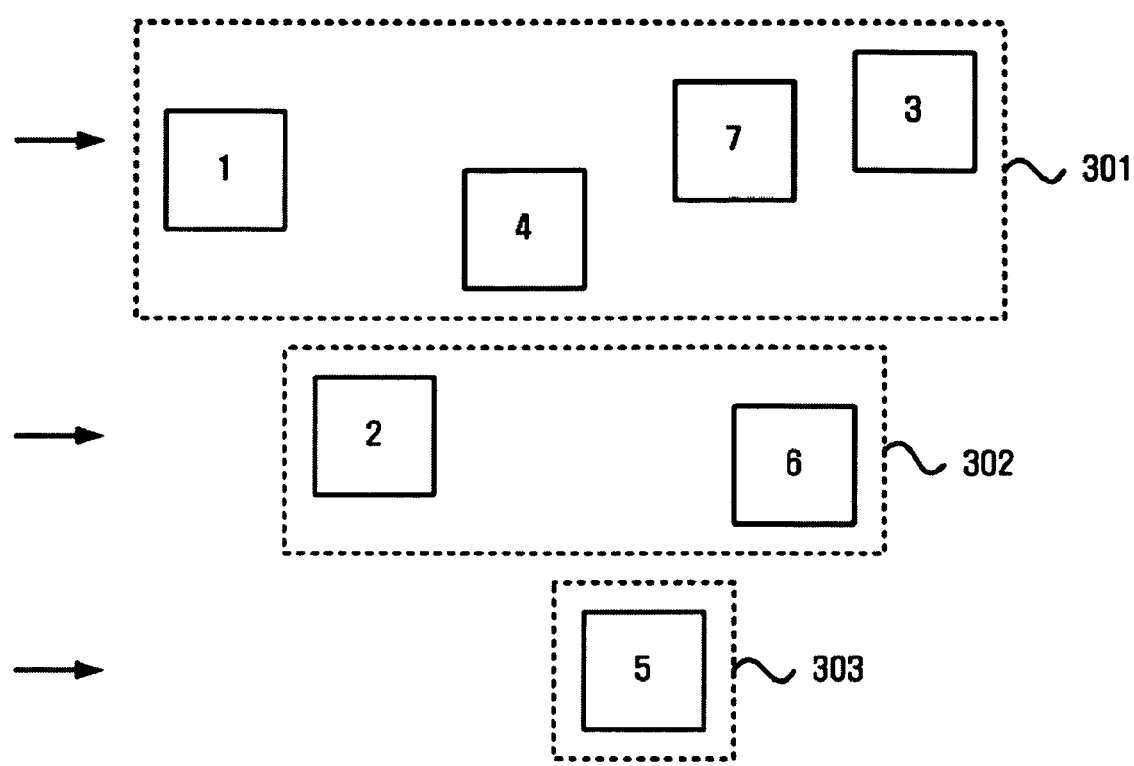
FIGS. 9A and 9B illustrate exemplary diagrams of a plurality of objects that are aligned according to their distance from a visual point.
Figure 9B:
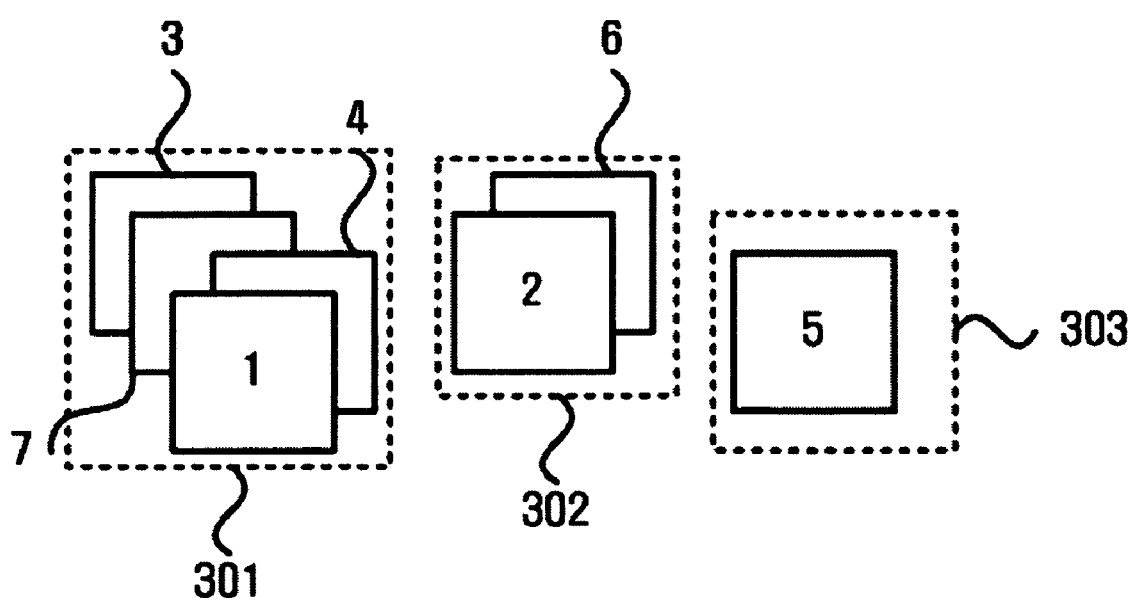

FIGS. 9A and 9A illustrate diagrams of a plurality of objects 1 through 7 that are aligned according to the distances of the objects 1 through 7 from a visual point. Referring to FIGS. 9A and 9B, the objects 1 through 7 may be aligned according to the distances of the objects 1 through 7 from a visual point in the following order: {1, 2, 4, 5, 6, 7, 3}. Since the objects 1 and 2 do not overlap each other, the object 2 may not necessarily have to be rendered earlier than the object 1.

As described above, once the alignment of the N objects $O_1$ through $O_N$ according to the distances of the N objects $O_1$ through $O_N$ from the visual point is complete, the N objects $O_1$ through $O_N$ may be divided into one or more groups, each group including one or more objects that overlap each other when viewed from the visual point, as illustrated in FIG. 9A.

Referring to FIG. 9A, a first group 301 includes the objects 1, 4, 7 and 3, a second group 302 includes the objects 2 and 6, and a third group 303 includes the object 5. Since none of the objects 1 through 7 belong to more than one group at the same time, the first through third groups 301 through 303 may be rendered in any order.

FIG. 10 illustrates a diagram of an algorithm for performing rendering in units of groups, each group including one or more objects that overlap each other when viewed from the visual point. Referring to FIG. 10, a function MakeRenderingOrder performs rendering on the i-th object $O_i$. Thereafter, if an object directly followed by the i-th object $O_i$ in a front list of the i-th object $O_i$, the front list including a number of objects that are in front of the i-th object $O_i$, is the j-th object $O_j$, the i-th object $O_i$ is removed from a back list of the j-th object $O_j$. Here, the back list includes a number of objects that follow the j-th object $O_j$. Thereafter, if no object is left in the back list of the j-th object $O_j$, the j-th object $O_j$ may be rendered. These processes may also be performed on objects other than the i-th and j-th objects $O_i$ and $O_j$. The algorithm of FIG. 10, however, is exemplary, and thus, the present invention is not restricted to this.

Conventionally, it takes a considerable amount of complicated computation to align and render a plurality of objects of a 3D GUI, thus making it difficult to realize real-time rendering in an embedded system having limited hardware performance.

On the other hand, the 3D graphic rendering apparatus 1 according to an exemplary embodiment of the present invention can reduce the amount of computation required for aligning a plurality of objects of a 3D GUI. Thus, the 3D graphic rendering apparatus 1 can realize precise alpha blending almost in real time, and is suitable for use even in an embedded system having limited hardware performance. Therefore, it is possible to provide various visual effects by facilitating the application of an alpha blending effect to translucent objects. In addition, it is possible to provide a visually natural 3D GUI and thus to provide a 3D GUI to various embedded systems.

A plurality of blocks of the accompanying block diagrams of the present invention and a plurality of operational steps of the accompanying flowcharts of the present invention may be executed by computer program instructions. The computer program instructions may be uploaded to general purpose computers, special purpose computers, or processors of other programmable data processing devices. When being executed by general purpose computers, special purpose computers, or processors of other programmable data processing devices, the computer program instructions can implement in various ways the functions specified in the accompanying block diagrams or flowcharts.

Also, the computer program instructions can be stored in computer-readable memories which can direct computers or other programmable data processing devices to function in a particular manner. When stored in computer-readable memories, the computer program instructions can produce an article of manufacture including instruction means which implement the functions specified in the accompanying block diagrams and flowcharts. The computer program instructions may also be loaded onto computers or other programmable data processing devices to allow the computers or other programmable data processing devices to realize a series of operational steps and to produce computer-executable processes. Thus, when being executed by computers or other programmable data processing devices, the computer program instructions provide steps for implementing the functions specified in the accompanying block diagrams and flowcharts of the present invention.

Further, the blocks of the accompanying block diagrams or the operational steps of the accompanying flowcharts may be represented by modules, segments, or portions of code which comprise one or more executable instructions for executing the functions specified in the respective blocks of operational steps of the accompanying block diagrams and flowcharts. The functions specified in the accompanying block diagrams and flowcharts may be executed in a different order from those set forth herein. For example, two adjacent blocks or operational steps in the accompanying block diagrams or flowcharts may be executed at the same time or in a different order from that set forth herein.

In this disclosure, the terms 'unit', 'module', and 'table' refer to a software program embodied on a computer-readable storage medium or a hardware device (such as a field programmable gate array (FPGA) or an application specific integrated circuit (ASIC)) which performs a predetermined function. However, the present invention is not restricted to this. In particular, modules may be implemented in a storage medium which can be addressed or may be configured to be able to execute one or more processors. Examples of the modules include software components, object-oriented software components, class components, task components, processes, functions, attributes, procedures, sub-routines, program code segments, drivers, firmware, microcode, circuits, data, databases, data architecture, tables, arrays, and variables. The functions provided by components or modules may be integrated with one another so that they can be executed by a smaller number of components or modules or may be divided into smaller functions so that they need additional components or modules. Also, components or modules may be realized to drive one or more CPUs in a device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A three-dimensional (3D) graphic rendering apparatus comprising:
  an object-information extraction module which extracts a bound box of each of a plurality of objects, including an i-th object and a j-th object, wherein i and j are natural numbers;
  an object alignment module which aligns the i-th object and the j-th object according to distances of the i-th and j-th objects, based on the extracted bound boxes of the i-th and j-th objects, from a visual point, wherein the object alignment module determines which of the i-th and i-th objects is in front of the other, aligns the i-th and i-th objects according to the result of the determining, and performs the aligning on the other objects;
  a rendering module which sequentially renders the aligned i-th and j-th objects such that an object among the i-th and j-th objects distant from the visual point can be rendered earlier than an object among the i-th and j-th objects less distant from the visual point;
  an overlapping object determiner which determines whether the i-th and i-th objects overlap each other when viewed from the visual point;
  a reference plane extractor which extracts at least one reference plane from the i-th and i-th objects if the i-th and i-th objects are determined to overlap each other when viewed from the visual point; and
  an object position determiner which determines which of the i-th and i-th objects is in front of the other object among the i-th and i-th objects by using the at least one extracted reference plane.

2. The 3D graphic rendering apparatus of claim 1, wherein the object-information extraction module comprises:
  an object coordinate extractor which extracts object coordinates of each of the bound boxes in an object coordinate system; and
  an object coordinate converter which converts the extracted object coordinates of each of the bound boxes to an eye coordinate system.

3. The 3D graphic rendering apparatus of claim 1, wherein the overlapping object determiner extracts one or more planes that are visible from the visual point from each of the bound boxes of the i-th and j-th objects, extracts a number of vertices that form the outline of the extracted one or more planes of the i-th object and a number of vertices that form the outline of the extracted one or more planes of the j-th object, and determines whether a first polygon formed by the extracted vertices of the i-th object and a second polygon formed by the extracted vertices of the j-th object overlap each other.

4. The 3D graphic rendering apparatus of claim 1, wherein if a plurality of vertices of the bound box of one of the i-th and j-th objects are all in front of a first plane of the bound box of the other object among the i-th and j-th objects, the reference plane extractor extracts the first plane as the reference plane.

5. The 3D graphic rendering apparatus of claim 1, wherein the object position determiner determines which of the i-th and j-th objects is in front of the other based on a number of reference planes extracted by the reference plane extractor.

6. The 3D graphic rendering apparatus of claim 5, wherein if only one reference plane is extracted by the reference plane extractor, the object position determiner determines which of the i-th and j-th objects is in front of the other object among the i-th and j-th objects by comparing the visual point and a position of the only one extracted reference plane.

7. The 3D graphic rendering apparatus of claim 5, wherein if two or more reference planes are extracted by the reference plane extractor, the object position determiner determines which of the i-th and j-th objects is in front of the other object among the i-th and j-th objects by comparing a first distance between one of a plurality of vertices of the bound box of the i-th object closest to the visual point and the visual point with a second distance between one of a plurality of vertices of the bound box of the j-th object closest to the visual point and the visual point.

8. The 3D graphic rendering apparatus of claim 1, wherein the rendering module divides the objects into one or more groups, each group comprising one or more objects that overlap each other when viewed from the visual point, and performs rendering in units of the one or more groups.

9. The 3D graphic rendering apparatus of claim 8, wherein the one or more groups may be rendered by the rendering module in any order.

10. A 3D graphic rendering method comprising:
    extracting, by a processor, a bound box of each of a plurality of objects, including an i-th object and a j-th object, wherein i and j are natural numbers;
    aligning the i-th object and the j-th object according to distances, based on the extracted bound boxes of the i-th and j-th objects, of the i-th and j-th objects from a visual point, wherein the aligning comprises (i) determining which one of the i-th and i-th objects is in front of the other object among the i-th and i-th objects and aligning the i-th and i-th objects according to the result of the determining and (ii) performing (i) on objects other than the i-th and i-th objects among the plurality of the objects; and
    sequentially rendering the aligned i-th and j-th objects such that an object among the i-th and j-th objects distant from the visual point can be rendered earlier than an object among the i-th and j-th objects less distant from the visual point,
    wherein (i) comprises:
    (iii) determining whether the i-th and i-th objects overlap each other when viewed from the visual point;
    (iv) if the i-th and i-th objects are determined to overlap each other when viewed from the visual point, extracting at least one reference plane from the i-th and i-th objects;
    (v) determining which of the i-th and i-th objects is in front of the other object among the i-th and i-th objects by using the at least one reference plane; and
    (vi) aligning the i-th and i-th objects according to the result of the determining performed in (v).

11. The 3D graphic rendering method of claim 10, wherein the extracting comprises:
    extracting object coordinates of each of the bound boxes in an object coordinate system; and
    converting the extracted object coordinates of each of the bound boxes to an eye coordinate system.

12. The 3D graphic rendering method of claim 10, wherein (iii) comprises:
    extracting one or more planes that are visible from the visual point from each of the bound boxes of the i-th and j-th objects;
    extracting a first number of vertices that form the outline of the one or more extracted planes of the i-th object and a second number of vertices that form the outline of the one or more extracted planes of the j-th object; and
    determining whether a first polygon formed by the first number of extracted vertices of the i-th object and a second polygon formed by the second number of extracted vertices of the j-th object overlap each other.

13. The 3D graphic rendering method of claim 10, wherein if a plurality of vertices of the bound box of one of the i-th and j-th objects are all in front of a first plane of the bound box of the other object among the i-th and j-th objects, (iv) comprises extracting the first plane as the reference plane.

14. The 3D graphic rendering method of claim 10, wherein (v) comprises determining which of the i-th and j-th objects is in front of the other object among the i-th and j-th objects based on a number of reference planes extracted by the reference plane extractor.

15. The 3D graphic rendering method of claim 14, wherein if only one reference plane is extracted from the i-th and j-th objects, (v) further comprises determining which of the i-th and j-th objects is in front of the other object among the i-th and j-th objects by comparing the visual point and a position of the only one extracted reference plane.

16. The 3D graphic rendering method of claim 14, wherein if two or more reference planes are extracted from the i-th and j-th objects, (v) further comprises determining which of the i-th and j-th objects is in front of the other object among the i-th and j-th objects by comparing a first distance between one of a plurality of vertices of the bound box of the i-th object closest to the visual point and the visual point with a second distance between one of a plurality of vertices of the bound box of the j-th object closest to the visual point and the visual point.

17. The 3D graphic rendering method of claim 10, wherein the rendering comprises:
    dividing the objects into one or more groups, each group comprising one or more objects that overlap each other when viewed from the visual point; and
    performing rendering in units of the one or more groups.

18. The 3D graphic rendering method of claim 17, wherein in the performing the rendering, the one or more groups may be rendered in any order.

19. A non-transitory computer-readable storage medium storing thereon a program implementing functions of a 3D graphic rendering method, said functions comprising:
    extracting a bound box of each of a plurality of objects, including an i-th object and a j-th object, wherein i and j are natural numbers;
    aligning the i-th object and the j-th object according to distances, based on the extracted bound boxes of the i-th and j-th objects, of the i-th and j-th objects from a visual point, wherein the aligning comprises (i) determining which one of the i-th and j-th objects is in front of the other object among the i-th and j-th objects and aligning the i-th and j-th objects according to the result of the determining and (ii) performing (i) on objects other than the i-th and j-th objects among the plurality of the objects; and sequentially rendering the aligned i-th and j-th objects such that an object among the i-th and j-th objects distant from the visual point can be rendered earlier than an object among the i-th and j-th objects less distant from the visual point, wherein (i) comprises:

(iii) determining whether the i-th and j-th objects overlap each other when viewed from the visual point;

(iv) if the i-th and i-th objects are determined to overlap each other when viewed from the visual point, extracting at least one reference plane from the i-th and i-th objects;

(v) determining which of the i-th and j-th objects is in front of the other object among the i-th and j-th objects by using the at least one reference plane; and (vi) aligning the i-th and j-th objects according to the result of the determining performed in (v).

* * * * *